A. P. LAWLER.
LIQUID SEAL TRAP.
APPLICATION FILED JAN. 18, 1916.
1,224,181.
Patented May 1, 1917.
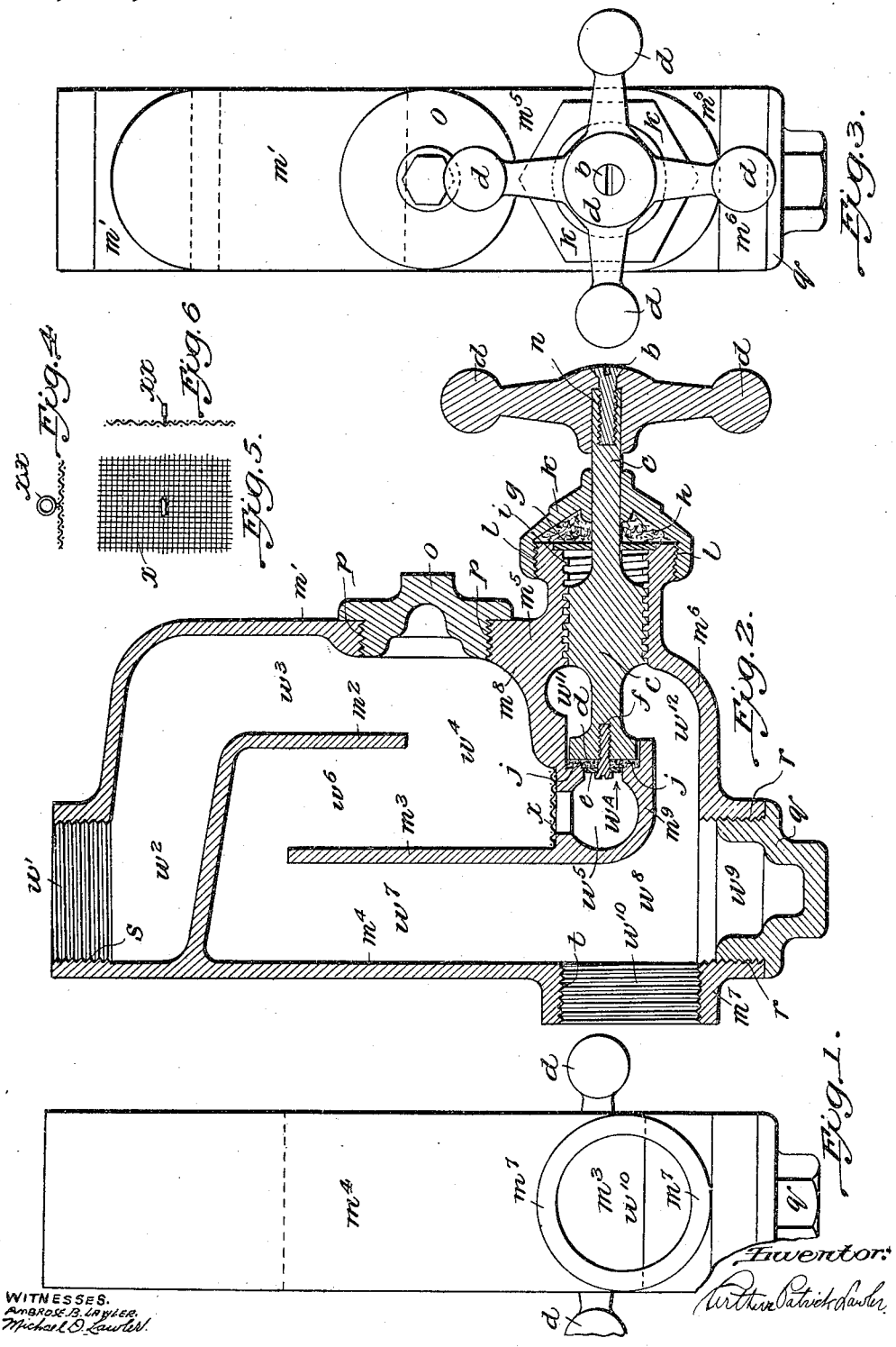

@# UNITED STATES PATENT OFFICE.

ARTHUR PATRICK LAWLER, OF BROCKVILLE, ONTARIO, CANADA.

LIQUID-SEAL TRAP.

1,224,181. Specification of Letters Patent. Patented May 1, 1917.

Application filed January 18, 1916. Serial No. 72,849.

*To all whom it may concern:*

Be it known that I, ARTHUR PATRICK LAWLER, a subject of Great Britain, residing in the town of Brockville, in the county of Leeds, in the Province of Ontario, in the Dominion of Canada, have invented certain new and useful Improvements in Liquid-Seal Traps; and I do declare that the following is a full, clear, and exact description of the invention, which will enable others skilled in the art to which it appertains to make and use the same.

My invention relates to liquid seal traps of the kind adapted to sinks, wash basins and the like and is of special construction as is shown, reference being had to the accompanying drawings, and to the letters and figures of reference marked thereon, which form part of this specification. It consists of outer walls and inner or partition walls of metal arranged in such a way and manner whereby the water or liquid passes over these walls, but some of it does not pass over, but remains inclosed therein between these walls and this water or liquid which remains hereby forms the trap. It has also placed in it in such a manner and place a mesh work of brass or copper wire whose sole purpose is to catch all dirt, tea leaves, etc., which may come down from the sink or basin above. This mesh work of brass or copper wire however is not absolutely necessary and the trap may and can be used without it. This trap has also a valve placed and arranged in such a manner that when it is closed, the water or liquid remains in the trap, but when it is open the water or liquid will run out of the trap into the drain pipe. The object of having such a valve placed at the particular location in this trap, is simply to enable a person to clean the trap quickly, and without the dirt and mess which is usually associated with the cleaning of the old style traps. This process of cleaning in my trap is conducted by simply opening the valve and flushing the water from the top above through the trap. This flushing of the water will then sweep before it any sediment or dirt which might lie or may be in the water passages "$w^3$," "$w^4$," and "$w^5$," out through the opening "$w^A$" shown on Fig. 2 into the chamber "$w^{12}$," and thence into the drain pipe. Any sediment, dirt or tea leaves which however will not pass through the screen "$x$" into the chamber "$w^5$" and thence out, will remain on the top of the screen "$x$." Then when cap "$o$" is removed from the casing of the trap, all dirt which has accumulated on the screen "$x$" can be easily removed. Then by closing the valve the trap is again formed. Also in this trap when the connection is made straight down through the floor, the fall of liquid is direct and on account of its construction the waste pipe is directly under the hole in the sink. Or the connection can be made at the bottom corner that is at right angles to the body of the trap as is shown. It has also a cap on the side or end of the trap, which cap is threaded and screws into the casing of the trap. This may be removed at any time, thus enabling a person to look at the interior construction of the trap. Also by its removal the liquid in the trap can be withdrawn through the opening left and also any dirt or sediment which might lie in the chambers "$w^3$," "$w^4$," or "$w^6$," or on the wire screen "$x$," or after removal of screen, in chamber "$w^5$", can easily be withdrawn. It is my intention to make this opening sufficiently large to enable a person to insert or withdraw the mesh work of wire "$x$."

The following detailed description will more fully explain the nature of said invention and the manner in which same is operated and used, and I attain this object by the mechanism illustrated in the accompanying drawings, comprising one (1) sheet in which—

Figure 1 is a left end view of the entire trap; Fig. 2 is an entire vertical section of the entire trap; Fig. 3 is a right end view; Fig. 4 is a top view of the mesh work of brass or copper wire with the handle of wire attached; Fig. 5 is a front view of same mesh work of brass or copper wire; Fig. 6 is a side view of same mesh work of brass or copper wire.

Similar letters refer to similar parts:— "$a$" is a metallic handle used for opening and closing the trap. It is attached to the stem "$c$" by a brass or iron screw marked "$b$." This screw screws into the stem "$c$" by means of the thread "$n$." The stem "$c$" works in the thread "$i$" as shown on the drawing. On the inner end of "$c$" is attached a fibrous washer "$d$," held in place by a metallic disk "$e$" and a screw "$f$." This washer keeps the seat water tight. At "$g$" is seen a section, representing a metallic cylinder, which sets in walls of metal "$m^5$," and "$m^6$." It is placed as shown and is for the purpose of preventing leakage and also to keep the packing which is placed in space "$h$" under the cap "$k$," which is screwed to trap casing by means of thread "$l$" from going down in the valve. On the seat proper an annular ring of metal is seen, denoted in drawing by the sections marked "$j$" whose purpose is simply to give additional contact with washer on stem "$c$." $m^1$, $m^2$, $m^3$, $m^4$, $m^5$, $m^6$, $m^7$, $m^8$, and $m^9$ denote the walls of metal which are used in the make up of the trap. "$o$" is a metallic nut or cap having an external thread attached to casing by means of thread "P." "Q" is a similar metallic nut or cap attached to casing by means of thread "$r$." "S" are threads which permit pipe from sink to be attached to trap. "$t$" are threads which permit drain pipe to be attached to trap. The water passages throughout the trap are denoted by $w^1$, $w^2$, $w^3$, $w^4$, $w^5$, $w^6$, $w^7$, $w^8$, $w^9$, $w^{10}$, $w^{11}$, $w^{12}$, and $w^A$ as shown in the drawings. "X" shown in detail in the different figures, denotes a coarse mesh work, of brass or copper wire or other material, and is placed approximately as shown. "$x\ x$" denotes a small piece of wire attached to the mesh work of brass or copper wire for purposes of lifting same out of trap or inserting same into trap.

In the drawings shown the trap is rectangular, but may be any other practicable shape and still be within my invention. However the present shape is preferred and generally used by me. An essential and a novel feature of the invention is the method of placement of the inlet and outlet openings, and also the operation and placement of the valve. From the drawing it is readily seen that the inlet and the outlet openings for a straight connection are in the same vertical line. Hence to locate the drain or waste pipe for this straight connection, all that is necessary to do is to drop a plumb line from the hole in the sink to the floor and the spot where the plumb line hits the floor is the exact center location of the drain pipe. A hole may then be cut or drilled in the floor and the drain pipe brought up through and attached to the trap at the outlet opening. The inlet opening being attached to the sink. In the interior of the trap, just under the inlet opening "$w^1$" I have placed an angular wall of metal "$m^2$" which is cast integral with the trap, and is of course necessarily water tight. To the left and directly under this wall I have placed another wall of metal "$m^3$" which is L shaped and which also is cast integral with the trap and which contains on its horizontal side a projection of metal which is to act as a seat, and which also contains on its vertical side a slight projection of metal which also is to act as a seat. Directly above the horizontal side of the L of the L shaped wall, and directly below the bottom of the angular wall "$m^2$" is another wall of metal "$m^8$" which is cast integral with the trap, and which contains at its inner end projections of metal which form part of the vertical and horizontal seats as described above. And the action of these walls is; the water enters at "$w^1$," it then travels the water passage "$w^2$," it then hits the wall "$m^2$" and is deflected into water chamber "$w^3$." It then settles into "$w^4$," and lies in, on and around the bottom of wall "$m^2$"; "$m^3$"; "$m^8$" and passages "$w^4$"; "$w^5$" and "$w^6$." Then it fills in "$w^6$" until it reaches the top of the wall of metal of "$m^3$." Now if you can imagine a line drawn at right angles horizontally, that is to the right from the top of the wall of "$m^3$," you have the level of the water which will always remain in the trap. Now as more water comes down the passages "$w^1$," "$w^2$," "$w^3$," etc., it will force the water which is already there in the trap over the wall of metal "$m^3$," and this water which goes over the wall of metal "$m^3$" passes down to "$w^7$," then on down to "$w^8$" and out into the drain pipe at "$w^{10}$," if the connection is made at right angles to the body of the trap, or out at "$w^9$" if the connection is made at the bottom of the trap. Then to clean trap the valve "$c$" is opened, and the water or liquid which remains in the trap portion of the trap, namely in the spaces designated by "$w^3$," "$w^4$," "$w^5$" and "$w^6$," all pass down through the mesh work of brass or copper wire "$x$" into the chamber designated by "$w^5$," and out through the opening "$w^A$" into the space marked "$w^{11}$" and into the space "$w^{12}$"; then it flows along the walls of the trap "$m^6$" to the space "$w^8$" and will pass out into the drain pipe at "$w^{10}$" or "$w^9$" depending upon whether the connection is made at the side or bottom. Then by flushing more water through the trap while the valve is opened, the trap can be entirely cleaned. For purposes of looking, to see if the trap is cleaned, I have equipped trap with a hole and a nut to close same, shown at "$o$." By removing this, one is able to look into space "$w^4$" and "$w^5$" and so ascertain if any dirt lies there. For purposes of catching large dirt such as tea leaves, etc., which might come down from the sink or basin above, and which might not find their way over the wall "$m^3$," I have placed on a seat of metal situated in walls "$m^8$" and "$m^8$" a mesh work of brass or copper wire equipped with a small piece of wire to act as a handle, which will enable same to be picked out easily and quickly, and which screen is designed just large enough to set on the seat, and to pass through the opening closed by nut "$o$." Then when trap is cleaned the valve "$c$" can be closed, and once more the trap is ready for use. To prevent siphoning it is my intention to carry the wall "$m^3$" high up and close to the wall "$m^2$," and to carry the wall "$m^2$" as close as convenient toward the wall "$m^8$." By doing this even although a siphonic action should ensue, yet from the design all of the liquid can not be siphoned out, and always will enough remain to prevent the sewer gases from penetrating the atmosphere of the room.

Having thus described my invention what I desire to claim is:—

In a liquid seal trap, the combination of a closed vessel provided with an inlet opening at the top near one side, and outlet openings at one bottom corner, one opening of which is situated in the same vertical line as the inlet opening, and the other opening situated in the side wall of the trap, a liquid and air tight removable plug at the side opposite the first named side, an inclined wall of metal projecting from the first named side acting as a baffle plate and situated immediately under the inlet opening, a vertical wall extending downward from the inner edge of the baffle plate, a vertical wall dividing the space under the baffle plate into upleg and downleg portions, an upwardly opening chamber at the lower edge of the wall and under the upleg portion, and a valve controlling communication between the chamber and the lower portion of the trap.

In testimony whereof I have hereunto set my hand in the presence of two subscribing witnesses.

ARTHUR PATRICK LAWLER.

Witnesses:
 HUGH FRASER,
 CHAS. A. PETERSON.